United States Patent [19]

Lundquist

[11] Patent Number: 5,213,470

[45] Date of Patent: May 25, 1993

[54] WIND TURBINE

[75] Inventor: Robert E. Lundquist, 5314 Ridgewood Heights Dr., Wilmington, N.C. 28403

[73] Assignees: Robert E. Lundquist; Steven J. Hultquist, both of Research Triangle Park, N.C.

[21] Appl. No.: 746,766

[22] Filed: Aug. 16, 1991

[51] Int. Cl.[5] .......................... F03D 11/04; F03D 1/00
[52] U.S. Cl. ....................................... 416/9; 416/137; 416/140; 416/147; 416/162; 416/206
[58] Field of Search ................. 416/14, 106, 135, 137, 416/140, 147, 159, 162, 206, DIG. 4, DIG. 6, 9

[56] References Cited

U.S. PATENT DOCUMENTS

| 690,950 | 1/1902 | Hau | 416/14 |
|---|---|---|---|
| 1,567,528 | 12/1925 | McDonald | 416/166 |
| 1,666,361 | 4/1928 | Thompson | 416/DIG. 6 |
| 2,074,952 | 3/1937 | Albers et al. | 416/9 |
| 3,228,480 | 1/1966 | Jorgensen | 416/157 R |
| 4,140,435 | 2/1979 | Huber | 416/206 |
| 4,239,977 | 12/1980 | Strutman | 416/DIG. 4 |
| 4,297,075 | 10/1981 | Jacobs et al. | 416/14 |
| 4,522,564 | 6/1985 | Carter, Jr. et al. | 416/140 R |
| 4,674,954 | 6/1987 | Kenfield | 416/14 |

OTHER PUBLICATIONS

Altamont Pass Wind Farms, brochure prepared through the cooperative efforts of the Pacific Gas and Electric Company and U.S. Windpower, Inc., Aug. 1990.
"Wind Energy Systems", Information Bulletin, U.S. Department of Energy, FS 135 Second Edition, Oct. 1985.
"Excellent Forecast for Wind," EPRI Journal, Jun., 1990 pp. 14-25.
"Wind Energy Program Summary vol. 1:Overview," Fiscal Year 1989, Programs in Renewable Energy, U.S. Dept. of Energy, Jan. 1990.
Acheson et al. *Vicous Damped Wind Vane* Jun. 1970.

Primary Examiner—Edward K. Look
Assistant Examiner—Michael S. Lee
Attorney, Agent, or Firm—Steven J. Hultquist

[57] ABSTRACT

A wind turbine assembly including a rotor body having mounted thereon a plurality of rotor blades. Each of the rotor blades may be joined at an inner extremity to a blade stem projection extending interiorly into the rotor body and secured to the rotor body by a torsional-spaced and axial-shock damping connection. The blade stem projection may also be secured within the rotor body in a manner allowing limited rotation of the blade stem projection relative to the rotor body, corresponding to a selective range of pitch of the associated rotor blade, with a system for rotating a blade stem projections of each of the rotor blades by corresponding degrees of rotation to provide a predetermined pitch of the rotor blades. Also disclosed are pitch-damping tower designs, and an integrated design wherein the tower is pitch- and yaw-damped.

15 Claims, 11 Drawing Sheets

WIND TURBINE

BACKGROUND OF THE INVENTION

1. Field of the Invention

This invention relates generally to wind turbine apparatus, and more specifically to a wind turbine rotor assembly of low weight and compact character, a turbine mounting system of low weight and flexible character with respect to its ability to translate in response to changes in wind direction, and a pivoting support tower.

2. Description of the Prior Art

A variety of wind turbine systems have been proposed and/or employed in the art.

These systems, while representing a wide variety of shapes, structures, and features, are generally classifiable by wind turbine axis direction, yaw character (free yaw, damped, or driven yaw), and wind turbine blade pitch (fixed pitch or variable pitch).

Horizontal axis wind turbines are characterized by an axis of rotation which is parallel to the ground. Vertical axis wind turbines are characterized by an axis of rotation which is perpendicular to the ground. Horizontal axis wind turbines may deploy the rotor either upwind or downwind of the associated supporting tower. Horizontal axis wind turbines typically feature one of three design modalities to adjust the position of the rotor to the changing direction of the wind. Free yaw wind turbines rotate freely on the supporting tower in response to wind direction, driven yaw wind turbines incorporate motors to rotate the turbine in response to changes in wind direction, so that the turbine actively tracks the changing direction of the wind. Damped yaw wind turbines include damping device(s) which decelerate the otherwise uncontrolled rotation of the turbine as the wind changes.

Variable pitch wind turbines include mechanisms for the adjustment of the pitch of the rotor blades with relation to the wind direction for maximum efficiency at a variety of wind speeds. Fixed pitch wind turbines feature stationary rotor blades which have a constant pitch in relation to the wind direction.

Wind turbine apparatuses also differ in rotor diameter and rated power output. Single generator and multiple generator configurations are known, and a wide range of power outputs are obtainable from wind turbine apparatuses which have been commercialized to date.

Wind turbine apparatuses may be mounted for operation on a wide variety of supports and towers, including self-supporting tubular towers, self-supporting lattice towers, or guyed tubular towers.

In addition to the above-described variant types of wind turbines, such turbines may feature a wide variety of ancillary structural and operation features. For example, a nacelle may be incorporated surrounding the rotor. Blade tip brakes may be incorporated to prevent damage caused by excessive rotational speeds at high wind velocities.

Examples of wind turbine apparatus which are commercially available and/o in actual use include wind turbine apparatus of the following manufacturers: Holec/Polenko, (Netherlands) (upwind, fixed pitch, dual yaw rotors, self-supporting tubular tower); Holec/-Windmatic (Denmark) (upwind, fixed pitch, dual yaw rotors, self-supporting lattice tower); Howden Windparks, Inc. (Scotland) (upwind, steel tubular tower with conical base); Micon (Denmark) (upwind, fixed pitch, self-supporting steel tubular tower with inside ladder to nacelle); Nordtank (Denmark) (upwind, fixed pitch, steel tubular tower); Vestas (Denmark) (upwind, lattice tower); HMZ-Windmaster (Belgium) (upwind, hydraulically pitched blades, tubular tower with inside ladder to nacelle); Dangren Vind Kraft/Bonus (Denmark) (upwind, fixed pitch, self-supporting steel tubular tower); FloWind Corp. (vertical axis); Enertech (downwind, free yaw, blade tip brakes, self-supporting tower); Fayette Manufacturing Corp. (downwind, blade tip brakes, guyed pipe tower); U.S. Windpower, Inc. (downwind, free yaw, variable pitch blades, remote computer control tripod tower); Danish Wind Technology (Denmark) (downwind, free yaw with hydraulic damping, variable pitch, computer control, steel tubular tower with inside ladder to nacelle); Energy Sciences, Inc. (downwind, blade tip brakes, free yaw, tilt-down lattice tower); Wind Power Systems (downwind, tilt- C down lattice tower, no nacelle); Danwin (Denmark) (upwind, tubular tower); BSW/Wagner (Germany) (upwind, fixed pitch, driven yaw, lattice tower); Alternegy/Aerotech (Denmark) (upwind, tubular tower with inside ladder to nacelle); W.E.G. (England) (upwind, tubular tower, variable pitch); and Windworld (Denmark) (upwind, fixed pitch, tubular tower).

Despite the wide variety of wind turbine systems which have evolved in the art to date, as exemplified by the above-discussed designs, there is a continuing need for an improved wind turbine apparatus of low weight and compact character, which is structurally and operationally adapted to perform in a wide variety of wind conditions, without adverse affect on the structural integrity and operability of the wind turbine system. Even in areas where the average wind speed is relatively constant on a seasonal or even annual basis, there nonetheless exist substantial variations in wind direction and intensity.

Such shifting wind conditions even in computer-controlled yaw-driven turbine systems, entail substantial "shock" forces—tensional, compressive, and torsional forces—on the rotor blades, carbon body and internal components, as well as the tower. Such shock forces, if not satisfactorily damped or otherwise attenuated, can severely shorten the operating life of the turbine assembly, and occasion damage to the turbine blades and components, thereby rendering the turbine apparatus deficient or even useless for its intended purpose.

In addition, the art is continually seeking reduced weight and more compact wind turbine structures, to render wind turbine systems more economic in character and competitive as alternative energy systems relative to conventional coal-fired generating plants, nuclear power facilities, and hydroelectric systems.

Accordingly it is an object of the present invention to provide an improved wind turbine assembly of low weight and compact character.

It is another object of the present invention to provide a wind turbine assembly which is of low weight and flexible character with respect to the ability of the wind turbine to translate in response to changes in wind direction.

It is a still further object of the present invention to provide an improved wind turbine assembly which features adjustable pitch rotor blades which are associated with independent suspension means, whereby mechanical and hydraulic shocks resulting from changes in wind direction and intensity are efficiently damped to minimize friction, wear, and damage to the wind turbine assembly.

It is still another object of the present invention to provide a wind turbine assembly mounting arrangement, by means of which the nacelle of the turbine assembly is secured to a supporting tower by coupling means which provide highly efficient pitch and yaw damping of the turbine.

Other objects and advantages of the present invention will be more fully apparent from the ensuing disclosure and appended claims.

SUMMARY OF THE INVENTION

The present invention relates to an improved wind turbine assembly, including improvements in the rotor body subassembly and means and method of securing rotor blades thereto, as well as improvements in wind turbine towers, and arrangements for securing wind turbines to supporting towers.

In one aspect, the invention relates to a wind turbine assembly including a rotor body having mounted thereon a plurality of rotor blades, wherein each of the rotor blades is joined at an inner extremity thereof to a blade stem projection extending interiorly into the rotor body and secured therewith to the rotor body by torsional- and axial-shock damping connection means. Such shock damping connection means may suitably employ any of a wide variety of means, such as springs, shock absorbers, and other biasing elements. Preferably each of the rotor blades is secured to the rotor body by independent damping connection means, to provide independent suspension to each of the rotor blades.

In another aspect, the present invention relates to a wind turbine assembly including a rotor body having mounted thereon a plurality of rotor blades, wherein each of the rotor blades is joined at an inner extremity thereof to a blade stem projection extending interiorly into the rotor body and secured therewithin to the rotor body in a manner allowing limited rotation of the blade stem projection relative to the rotor body, such limited rotation corresponding to a selected range of pitch of the associated rotor blade, and means for selectively rotating the blade stem projections of each of the rotor blades by corresponding degrees of rotation to provide predetermined pitch of the rotor blades.

The means for selectively rotating the blade stem projections of each of the rotor blades may suitably comprise:

(a) a control rod mounted coaxially within the rotor body with respect to the axis of rotation of the rotor body;

(b) means coupling the blade stem projection with a first end of the control rod such that axial translation of the control rod in a first direction tensionally exerts a rotational force on the blade stem projection in a first rotational direction and axial translation of the control rod in an opposite second direction detensionally exerts a rotational force on the blade stem in a second rotational direction opposite the first rotational direction; and (c) means for selectively axially translating the control rod in a selected one of the first and second directions.

The coupling means (b) in the above-described assembly may suitably comprise a cable and pulley arrangement, preferably one which includes a fluid-damped shock absorber coupled to the cable.

The selected axial translation means (c) may comprise a piston joined to a second of the control rod and mounted in a hydraulic cylinder, with means for selectively introducing hydraulic fluid into the cylinder to effect axial translation of the control rod in a selected one of the first and second directions.

In a further aspect, the present invention relates to a wind turbine assembly including a rotor body having mounted thereon a plurality of rotor blades, a nacelle to which the rotor body is coupled for rotation with respect to the nacelle; and a tower having an upper portion to which the nacelle is secured by coupling means, and a lower portion positionable on a support body, e.g., the ground. The coupling means comprise:

- a swivel mounted member interconnecting the nacelle and the upper portion of the tower to permit rotation of the nacelle and rotor body relative to the tower;
- a first damping member interconnecting the nacelle and the upper portion of the tower, for pitch damping of the nacelle;
- a second damping member interconnecting the swivel mounting member and a first side of the tower upper portion, for damping yaw of the nacelle in a first yaw direction; and
- a third damping member interconnecting the swivel mounting member and a second side of the tower upper portion, for damping yaw of the nacelle in a second yaw direction opposite to the first yaw direction.

The first, second, and third damping members of the system described in the preceding paragraph may be independently selected from the group consisting of spring biasing elements, tensionally flexible guying cables, and fluid-damped shock absorbers.

In still another aspect, the invention relates to a wind turbine assembly comprising a rotor body having a primary drive ring or sun gear attached thereto and engageable with a reduction gear which in turn is connected to power generator unit(s), whereby the reduction gear is driven by the primary drive ring gear for generation of power by the generator unit. The reduction gear may be mounted on a power transmission shaft joined to the power generating unit, wherein the transmission shaft has associated therewith breaking and/or disengagement means to accommodate wind "cut in" and "cut out" conditions. The ring or sun gear may also be associated with a plurality of reduction gears, each of which is coupled to an appertaining power generating unit, whereby the wind turbine assembly comprises a plurality of such units.

The tower employed with the wind turbine assembly of the present invention may be configured in a wide variety of forms. In one aspect, the tower may be of a pivoting booming tower configuration, capable of a 360° damped tower yaw. Such tower may incorporate a redundant limited yaw damping system at the upper extremity of the tower. By limited yaw damping is meant a free yaw for a portion of the circle of rotation, e.g., 270, with the yaw outside of such free yaw band of the rotational circle being damped by suitable damping means such as shock absorbers, coil springs, or similar means.

The wind turbine assembly of the present invention may utilize any suitable number of blades, preferably from two to six blades.

Other aspects and features of the present invention will be more fully apparent from the ensuing disclosure and appended claims.

DETAILED DESCRIPTION OF THE INVENTION, AND PREFERRED EMBODIMENTS THEREOF

Figure 1:
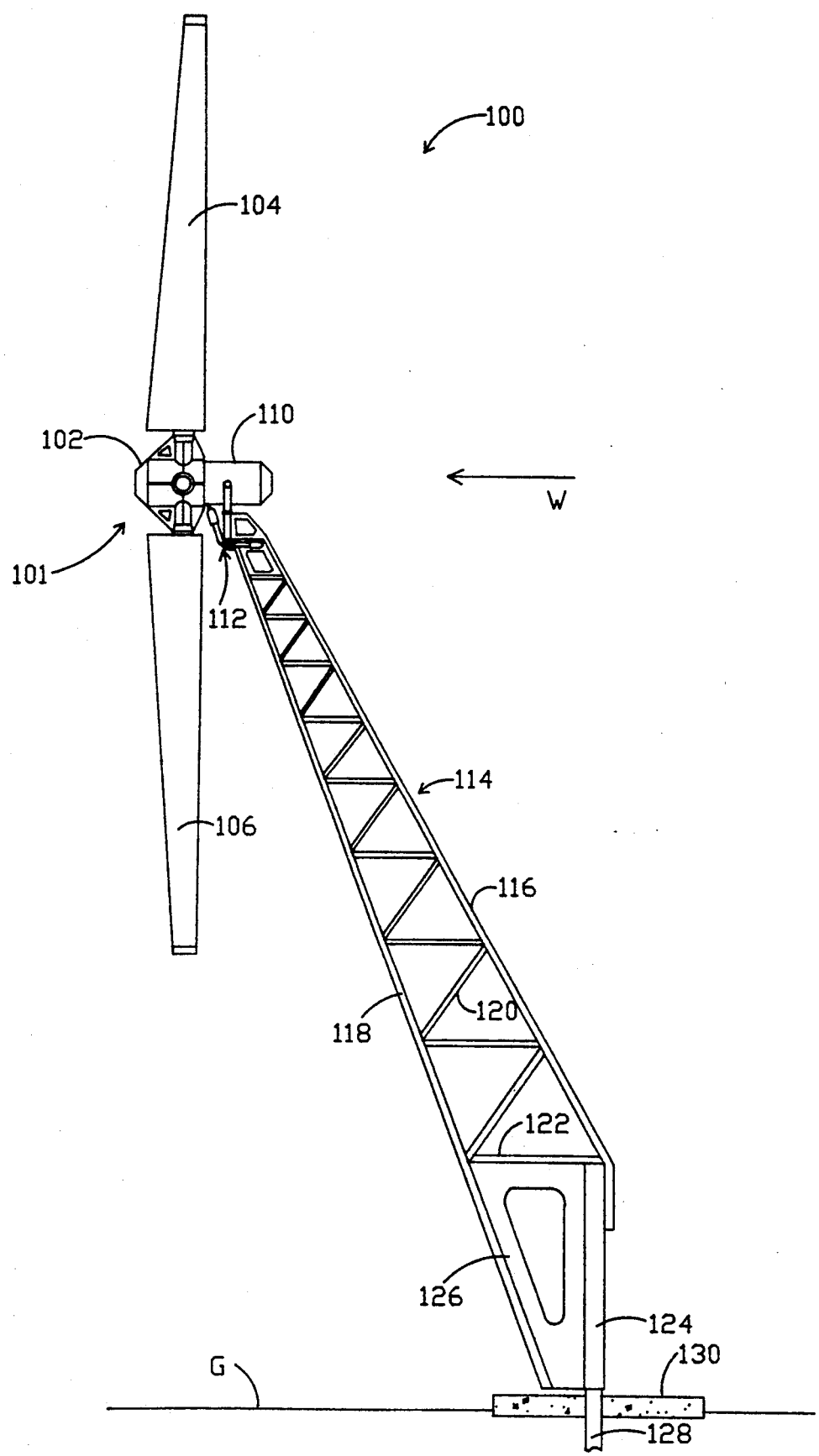
FIG. 1 is a side elevation view of a wind turbine assembly according to one embodiment of the present invention, comprising a downwind rotor design.
Figure 2:
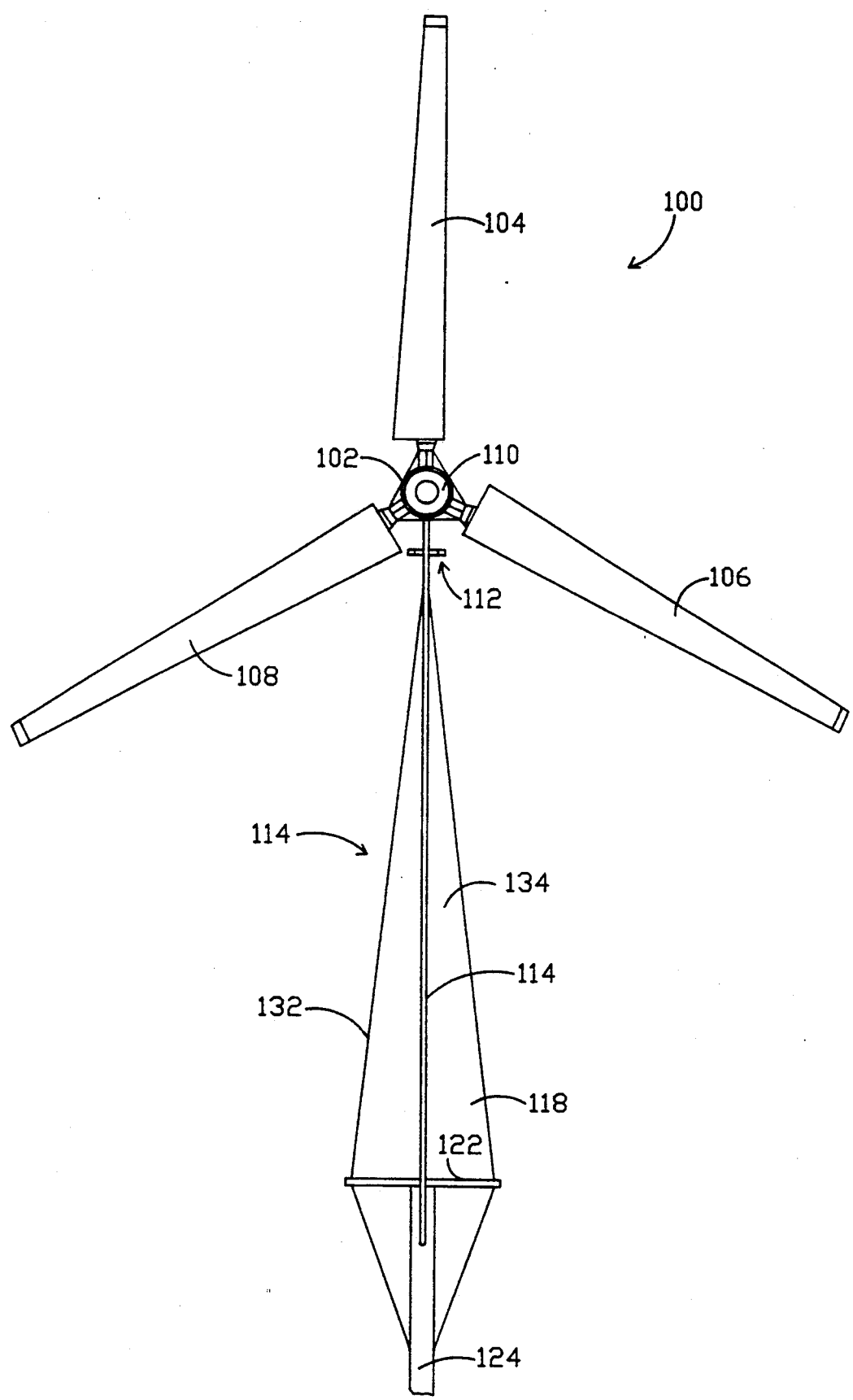
FIG. 2 is a front elevation view of the wind turbine assembly of FIG. 1, viewed toward the downwind direction.

Referring now to the drawings, FIG. 1 shows a side elevation, and FIG. 2 a corresponding front elevation view (looking toward the downwind direction) of a wind turbine assembly 100 according to one embodiment of the present invention.

As shown in FIG. 1, the wind direction is indicated by arrow W.

The wind turbine assembly 100 shown in these drawings comprises a wind turbine 101 mounted on a tubular support tower 114.

The turbine 101 comprises a rotor body 102 having mounted thereon a plurality of rotor blades 104, 106, and 108. The rotor body 101 is rotatably mounted on and connected to the nacelle 110, which in turn is joined to an upper portion of tower 114 by coupling arrangement 112.

The tower 114 is a tubular support tower, comprising an upwind spar member 116 and a downwind spar member 118 in spaced-apart relationship to one another, as shown, and interconnected by a lattice-work structure of diagonal bracing members 120 and horizontal bracing members 122. At the lower portion of the tower, the spar members 116 and 118 are joined to tubular member 124 and flange member 126, respectively. Tubular member 124 is telescopingly mounted on shaft 128 extending through footing member 130 disposed at ground level G, as shown. By this arrangement, the tower 114 is able to freely rotate about shaft 128, as damped by yaw damping means of the coupling arrangement 112, as hereinafter more fully described.

The footing member 130 may be of concrete or other suitable structural material, of a sufficient size, weight, and stability to anchor the tower structure, and for this purpose, shaft 128 may extend downwardly into the ground for a suitable distance to impart structural stability and rigidity to the tower 114.

The tower 114 itself may be formed of any suitable material of construction, preferably high strength metal or other materials such as high-strength engineering composites, etc.

Correspondingly, the rotor body 102, rotor blades 104, 106, and 108, and nacelle 110 may be constructed of any suitable materials, including metal, engineering plastics, composites, structural ceramics, and the like.

Figure 3:
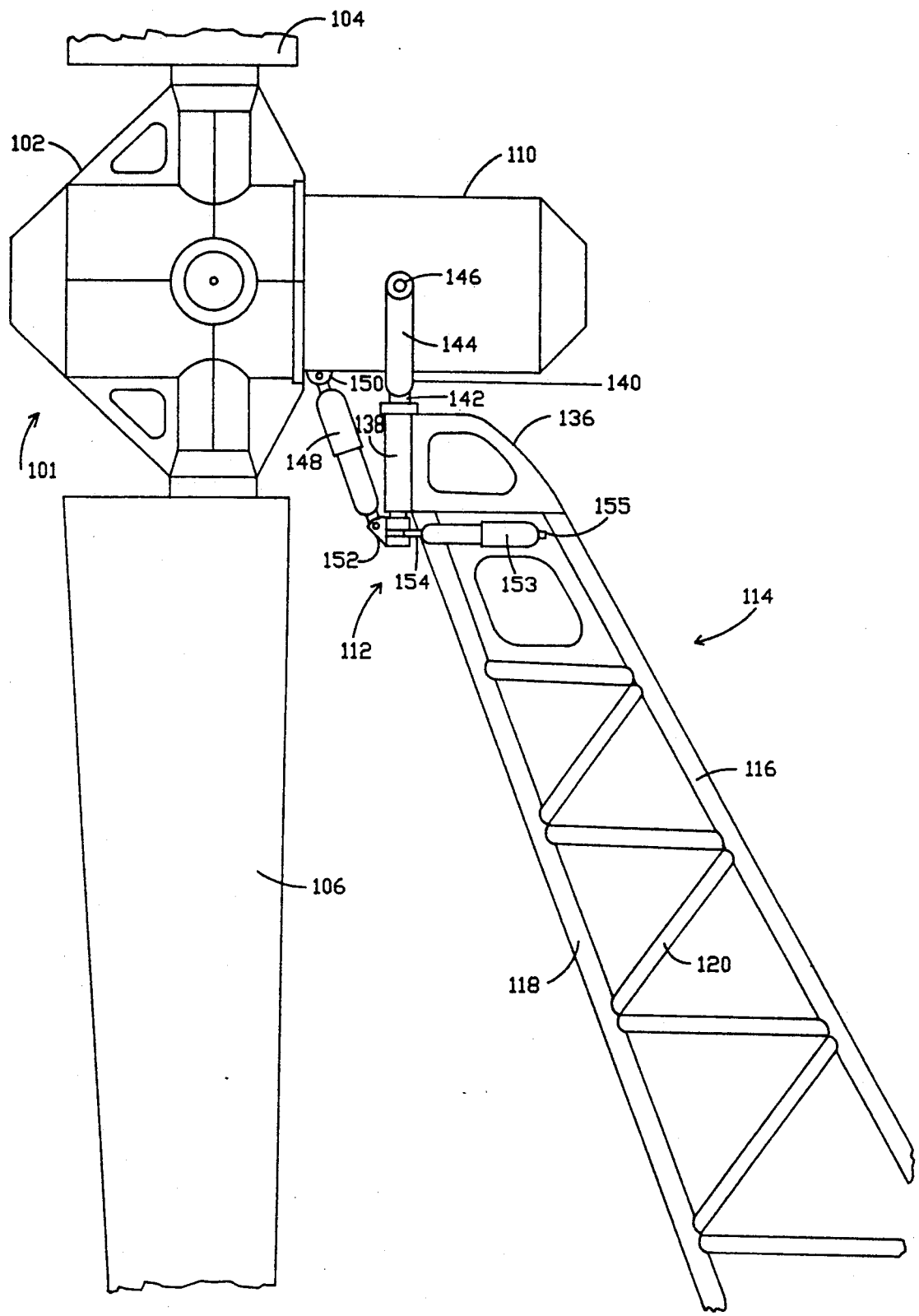
FIG. 3 is a side elevation view of a portion of the wind turbine assembly of FIGS. 1 and 2, showing the details of the coupling arrangement by means of which the nacelle of the turbine is secured to an upper portion of the tower.

Referring now to FIG. 3, there is shown a portion of the wind turbine assembly of FIGS. 1 and 2, showing the details of construction of the coupling arrangement 112, by means of which the turbine 101 is secured to an upper portion of tower 114.

As illustrated, the rotor body 102 of turbine 101 has mounted thereon rotor blades 104 and 106, and the rotor body 102 is coupled to nacelle 110, such that the rotor body 102 is freely rotatable against the stationary nacelle 110. The nacelle 110, as shown more fully hereinafter, contains power generator units, and associated power transmission, gearing, and control means necessary for proper operation of the turbine. The nacelle thus defines a turbine body portion which remains stationary and which must accommodate the movement, vibration, shocks, and forces which arise in connection with the operation of the turbine 101, in a manner ensuring structural integrity of the overall assembly and reliable operation in terms of continuity of operation and minimization of down-time.

The nacelle 110 is mounted on the tower 114 by means of Y-shaped yoke member 140, the upper legs 144 of which are joined to the nacelle 110 at opposite sides thereof, by means of fasteners 146, e.g, mechanical fastening means. The lower stem 142 of yoke member 140 is telescopically positioned in cylindrical member 138 which is in turn associated with a flange cap 136 at the upper end of the tower and joined to spar members 116 and 118 and to support brace 132. The spar members 116 and 118 are, as previously described, in space-apart relationship to one another, and are braced with a lattice-work comprising diagonal brace members 120 and horizontal brace members 122.

At its lower extremity, the stem 142 of yoke member 140 is joined to an oarlock connector 152, to which in turn is joined a pitch-damping shock absorber 148, one end of which is joined to the oarlock connector 152, and the other end of which is joined by means of connector structure 150, which as shown may comprise a flange and an associated pin or other mechanical fastener element for securing the shaft of the shock absorber to the nacelle 110.

The oarlock connector 152 is also connected, on either side of the tower with yaw-damping shock absorbers. As shown in FIG. 3, a shock absorber 153 is generally horizontally disposed, with its stem 154 at one being joined to the oarlock connector 152, and with the opposite stem 155 being secured to the brace member 132 by any suitable means, as for example welding, mechanical fastening, or the like. Thus, the oarlock connector 152 is joined on each side of tower 114 with a corresponding shock absorber, so that the opposite side to that shown in FIG. 3 features a shock absorber corresponding to shock absorber 153, whereby each side is symmetrically constructed with respect to such yaw-damping shock absorber.

By this arrangement, said variations in wind speed and/or intensity, e.g., wind gusting and shifts, which tend to displace turbine 101 from its horizontal axis are damped by pitch-damping shock absorber 148.

Correspondingly, wind shifts which tend to produce displacement of the wind turbine in a horizontal or lateral plane (yaw movement) are damped by the yaw-damping shock absorbers, including shock absorber 153, and a corresponding shock absorber (not shown) on the opposite side of the tower 114.

It will be recognized that although the coupling arrangement 112 of FIG. 3 is illustrated as comprising shock absorbers 148 and 153, that other pitch-damping and yaw-damping elements may be employed, such as spring biasing elements, or other means which damp such pitch and yaw movements.

Further, while the rotor body 102 of FIGS. 1–3 has been shown with reference to three rotor blades mounted thereon, it will be appreciated that a greater or lesser number of rotor blade could be employed. Generally, however, for the sake of relative mechanical simplicity, symmetry, and compactness of structure, from 2 to 6 rotor blades are preferred.

Figure 4:
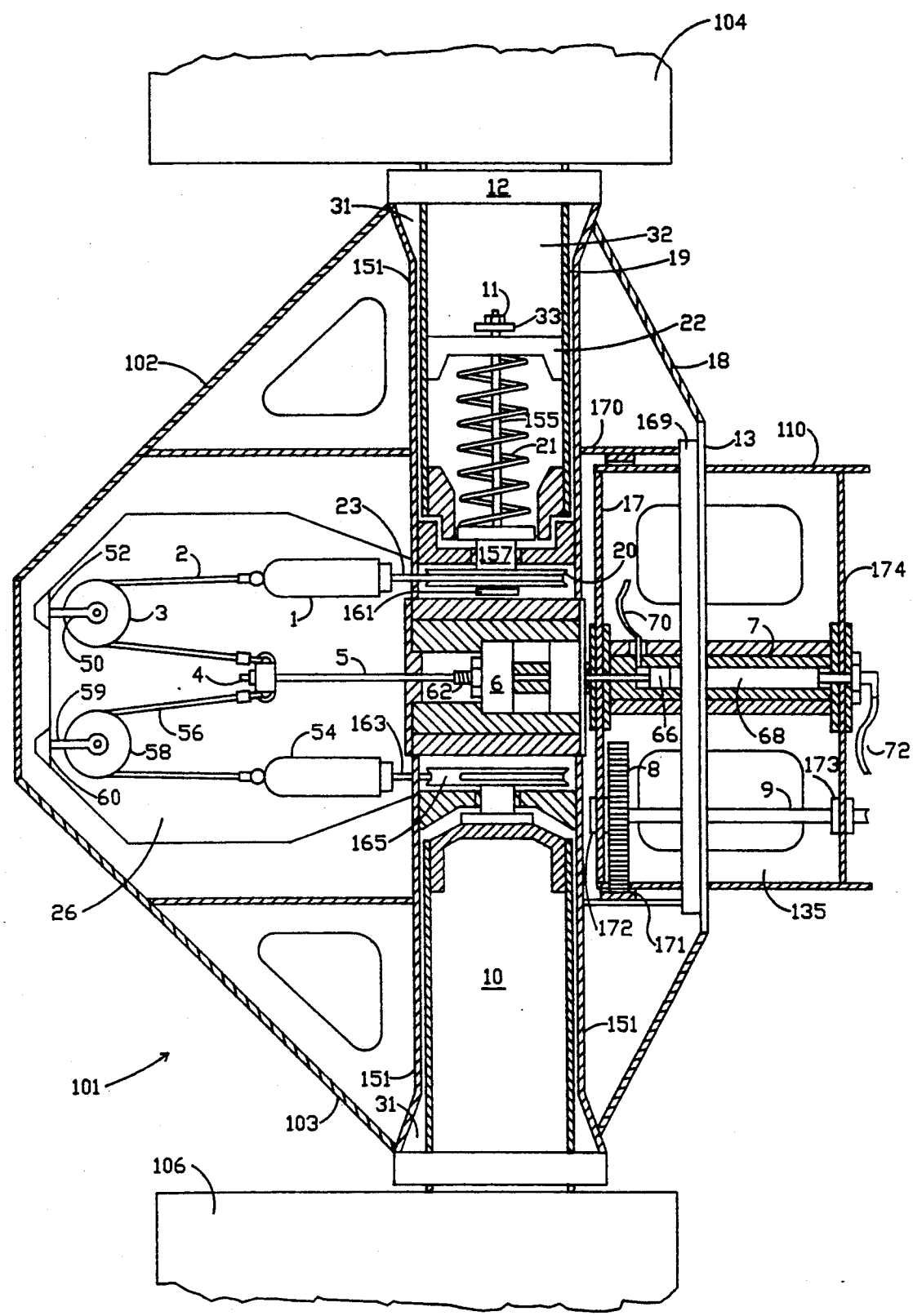
FIG. 4 is a sectional plan view of the rotor body and associated turbine housing portion illustrating the internal structure thereof, and the independent suspension of the rotor blade elements relative to the rotor body.

FIG. 4 shows a cross-sectional view of rotor body 102 of turbine 101 and the associated power transmission and generator section 135 of the turbine, as contained within nacelle 110.

The rotor body is shown as having rotor blades 104 and 106 mounted thereon.

The rotor body 102 comprises a structural housing including front wall member 103 and rear wall member 18. At regular intervals about its circumference, and corresponding to the locations of the rotor blades, are cylindrical wall members 151, defining cylindrical cavities 31 as receptacles for the appertaining rotor blade stem projections, or blades spars, 10. The rotor blade stem projection 10 is formed by a cylindrical wall member 19, of smaller diameter than cylindrical wall member 151, which at an intermediate interior portion thereof has a transversely extending, generally disc-shaped support 22 secured to the wall member interior surface, such as by welding, mechanical fastening, etc. A free-swiveling anti-flyout rod 155 is mounted coaxially with respect to cylindrical wall members 19 and 151 in cavity 31, being secured at its inner end by mounting block 157, to which a coil spring 21 is secured, by welding, mechanical fastening, etc. The coil spring thus is helically circumscribingly disposed about anti-flyout rod 155, and at its upper end abuts the support member 22. Anti-flyout rod 155 extends outwardly through a corresponding aperture (not shown) in support member 22 and is secured by means of bolt 11 at its outer extremity to a retainer plate 33.

At the outer end of the rotor blade stem projection is disposed a frame member 12, which serves to enclose the cylindrical cavity 31 and also to function as a stiffening or rigidifying member for the turbine.

Although not shown for purposes of clarity, bearing means, such as roller or ball bearings may advantageously be disposed between cylindrical wall members 19 and 151, whereby the former may be rotated against the latter within the limits imposed by the coil spring 21, and the pitch adjustment subassembly described hereinafter.

In operation, the coil spring 21 acts to radially and torsionally damp the turbine with respect to shocks and forces exerted on the corresponding rotor blades. Each of the rotor blade stem projections is configured in the above-described manner, such that an independent suspension system is provided, with each rotor blade being axially and torsionally damped with respect to radial and torsional forces which may otherwise damage the turbine or its component parts, or otherwise adversely affect the efficiency and operability of the turbine assembly.

Also shown in the FIG. 4 embodiment is a variable pitch adjustment subassembly disposed in the rotor body 102, and comprising control rod 5 and an associated means for adjusting the pitch of the rotor blades to a selected value, in response to axial translation of the control rod.

As shown, the control rod at its distal (downwind) end is joined to a swivel assembly 4, by means of which the swivel can freely rotate on the control rod during rotation of the rotor body. The swivel assembly may be suitably formed of a wear-resistant material, such as titanium or other high strength, wear-resistant metal or alloy, or other suitable tribological material of construction. The swivel assembly 4 is joined to a control cable 2 which traverses pulley 3 and is joined at an opposite end to damping element 1, which may be an air-damped shock absorber, or other damping means such as a spring biasing unit. The damping means 1 at its end opposite the connection with cable 2, is joined to cable 23 which traverses pulley 20 which is secured to mounting block 157 by means of securement pin 161. Pulley 3 is secured by means of yoke element 50 to an anchor element 52 disposed in the aft (downwind) extremity of the rotor body. Symmetrical thereto, the swivel assembly 4 also is joined to control cable 56 traversing pulley 58 and joined at an opposite end to damping means 54, which at its proximal (upwind) end is joined to cable 163 traversing pulley 165, which is mounted in the same fashion as pulley 20 (specific mounting structure not shown for clarity). Pulley 58 is joined by yoke member 59 to anchor unit 60.

The control rod 5 at its proximal portion passes through bearing 6 and collar subassembly 62, and is joined at its proximal extremity to piston 66 disposed in hydraulic cylinder 68. The hydraulic cylinder 68 in turn is joined at its respective extremities to hydraulic fluid lines 70 and 72, as shown, whereby hydraulic fluid may be selectively introduced through either one of hydraulic lines 70 or 72 (with fluid correspondingly being removed through the other line of such pair), to effect translation of the piston 66 in the hydraulic cylinder. For this purpose the hydraulic fluid lines 70 and 72 may be joined to any suitable hydraulic fluid pump and reservoir means (not shown for clarity).

By this variable pitch control arrangement, the hydraulic piston 66 may be selectively translated in a windward or leeward direction to correspondingly axially translate the control rod 5, whereby the cables 2/23 and 56/163 are selectively "tightened" or "loosened" to correspondingly rotate the pulleys 20 and 165, whereby the pitch of the respective rotor blades is correspondingly varied to a desired extent, relative to the pitch at the starting position.

The hydraulic cylinder 68 is circumscribed by a hollow axle 7 mounted in the interior volume 135 within nacelle 110.

The frontal wall portion 13 circumscribes nacelle 110, and is suitably provided on its downwind side with a bearing structure 169, by means of which the frontal wall portion 13 engages the nacelle 110 in a manner allowing free rotation of the rotor body 102 against the nacelle.

In the interior space 26 of the rotor body, is disposed a shroud 170 which is joined to wall 151 at one end, and to frontal wall portion 13 at the other. On an interior wall surface of the shroud is mounted an inverse-toothed primary drive gear 171, extending circumferentially around the entire interior surface of the shroud 170, which is of cylindrical shape. This drive gear engages a reduction gear 8 mounted on a power transmission shaft 9 which is journaled in bearings 172 and 173 in transverse wall members 175 and 174, respectively. The power transmission shaft extends forwardly in the interior volume 135 within nacelle 110 and is coupled by suitable means to a power generator unit (not shown).

In this manner, rotation of the rotor body 102 during operation of the turbine 101 effects rotation of the shroud 170 bearing drive gear 171 on its interior surface, and drive gear 171 engages reduction gear 8 to drive power transmission shaft 9 and thereby provide motive movement to the generator unit to produce energy.

The generator unit employed in conjunction with wind turbine 101 may be suitably mounted in the interior volume 135 defined by nacelle 110, as hereinafter described. The generator may be of any suitable type, to produce alternating current output, or alternatively such generator may be employed in conjunction with invertor means to provide a direct current whereby the energy may subsequently be stored in batteries, or otherwise. Alternatively, both AC and DC power generating means may be employed, as necessary or desirable in a given end use application. Further, the number of generator units may be increased to any suitable number, as hereinafter more fully described, and each of such plural generator units may be suitably coupled to the drive gear, by suitable gearing or motive transmission means as may be usefully employed for such purpose and as are well known to those skilled in the art.

In lieu of the above-described gearing system employing a ring gear, (primary drive gear 171), there may alternatively be employed a planetary gearing system comprising a sun gear which is mounted on a central shaft or other rotating portion of the rotor body, as well as an other suitable gearing or power transmission arrangement, whereby the rotational power generated by the rotor body is transferred to the power generating means employed in the turbine body.

Figure 5:
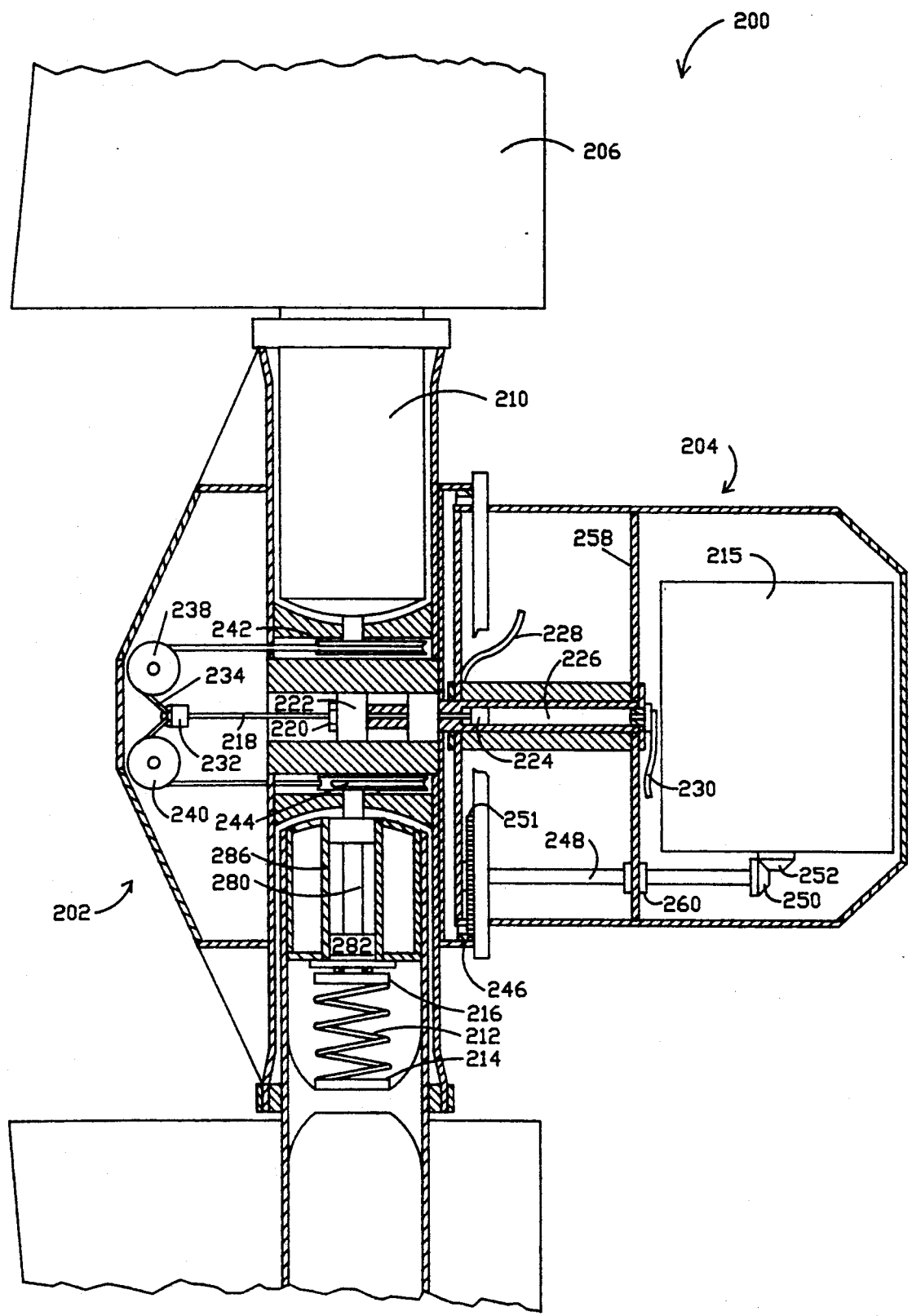
FIG. 5 is a plan view, in partial second, showing the internal structure of a turbine and independent suspension and variable pitch control of the associated rotor blades, together with the power generator unit in the upwind portion of the turbine.

FIG. 5 is a plan view, in partial section, of a wind turbine assembly 200 according to another embodiment of the present invention. Such assembly comprises a rotor body 202 coupled with and rotatable against stationary nacelle 204 defining an interior nacelle volume including generator, power transmission, and hydraulic control means, as hereinafter described.

The rotor body 202 as shown has mounted thereon rotor blades 206 and 208, each of which terminates in a blade stem projection 210 extending radially inwardly of the rotor body 202. Each of the rotor blade stem projections 210 may be interiorly assembled and arranged as previously described with respect to the embodiment of FIG. 4, including the provision of a coil spring 212 joined at its respective extremities to a transverse support member 214 and mounting block 216 as illustratively shown in FIG. 5. The coil spring 212 thus provides independent suspension for the blade assembly comprising blade 208 and its associated blade stem, it being understood that all other blade assemblies of the turbine system are similarly constructed. It will be understood that in lieu of the coil spring assemblies provided in the respective blade stem units, other suspension means may be employed for independent damping of shocks, radial, translational, and torsional forces, in place of the specific coil spring subassembly illustratively shown in the drawing.

The mounting block 216 is joined to shaft 280 extending through bearings 282 and 284 inside the cylindrical housing 286 within the blade stem projection. The shaft 280 is connected, as shown, to the eccentric cam pulley 244, by means of which the pitch of blade 208 can be adjusted, by the pitch adjustment means hereinafter described. Each of the blade stem projections may be similarly constructed, whereby a predetermined pitch angle may be established for the rotor blades of the wind turbine, prior to and/or during operation.

In the interior volume of the rotor body 202 is mounted a rotor blade pitch adjustment subassembly, including control rod 218 joined at a distal end thereof to swivel assembly 232 and joined at its proximal end to piston 224 in hydraulic cylinder 226 in fluid flow communication with hydraulic feed/discharge lines 228 and 230. The control rod 218 extends through a bearing 222 and is secured to the bearing by a mechanical coupling 220 which allows axial movement of control rod 218 through the bearing.

A control cable 234 extends through an eyelet of swivel assembly 232, and traverses pulleys 238 and 240, being connected at its respected ends to pulley 242 and pulley 244, as shown.

By this arrangement, the control rod 218 can be selectively axially translated to vary the pitch of the rotor blades 206 and 208 by rotation of the corresponding blade stem projections 210.

In lieu of the hydraulically-controlled pitch adjustment subassembly illustratively shown in FIG. 5, there may be employed a mechanical pitch adjustment subassembly, such as a rack and pinion unit with an associated drive motor. In such mechanical subassembly, a rack could be mounted for linear reciprocating movement in a suitable bearing structure, with one end of the rack being connected to the control cable 234, and with such rack being engaged with a pinion, or alternatively a worm gear, connected in turn to a selectively actuatable drive motor, whereby the rack is able to be forwardly or rearwardly translated to tensionally or detensionally adjust the pitch via the control cable. Alternatively, such a rack and pinion arrangement may be directly mechanically coupled to pulleys 242 and 244, without any control cable being required.

It will be appreciated that all of the pitch-adjustment and independent suspension means, as well as all other controllable elements of the wind turbine of the present invention may be separately or interdependently controlled by automatic control means, whereby optimal efficiency of the wind turbine may be achieved in its operation. For example, the aforementioned controllable means may be under the concurrent control of a microprocessor-based control system which is dependently coupled to wind speed and/or wind direction sensors, whereby the pitch of the rotor blades and the "springiness" of the independent suspension system may be adjusted automatically to achieve such optimal operation.

At the windward extremity of the rotor body 202, on an inner surface of the housing wall is mounted an inverse-toothed primary drive gear 246 extending circumferentially around the entire circumferential extent of the cylindrical wall. The primary drive gear 246 at its inner surface engages reduction gear 251 which in turn is joined to power transmission shaft 248 journaled in bearing 260 at transverse wall 258. A drive gear 250 is mounted at the proximal extremity of shaft 248 and engages gear 252 mounted on a shaft (not shown) of generator unit 215. In this manner, the rotation of the rotor body is transmitted by drive gear 246 to reduction gear 251 and the motive power is transmitted to generating unit 215 to generate power. The power generated by unit 215 may be passed by suitable power transmission means, e.g. cables or wires, to a suitable power transmission system such as an electric power grid, by means and arrangement well known to those skilled in the art.

As previously discussed, the number of generating units in the interior volume defined by the nacelle may be one, or more than one. Typically, from 2 to 8 generator units are employed when multiple generators are utilized. Each of such multiple generator units (not shown) may be suitably coupled with the primary drive gear, as hereinafter more fully described, to realize the benefit of such additional power generating capacity. In this manner, generating capacities of as large as 750 kilowatts or one megawatt can be achieved, with corresponding sizing of the wind turbine assembly. The turbine assembly of the present invention thus may be greatly varied in size and construction thereof with respect to the number, size, and location of generator unit(s) therein.

Figure 6:
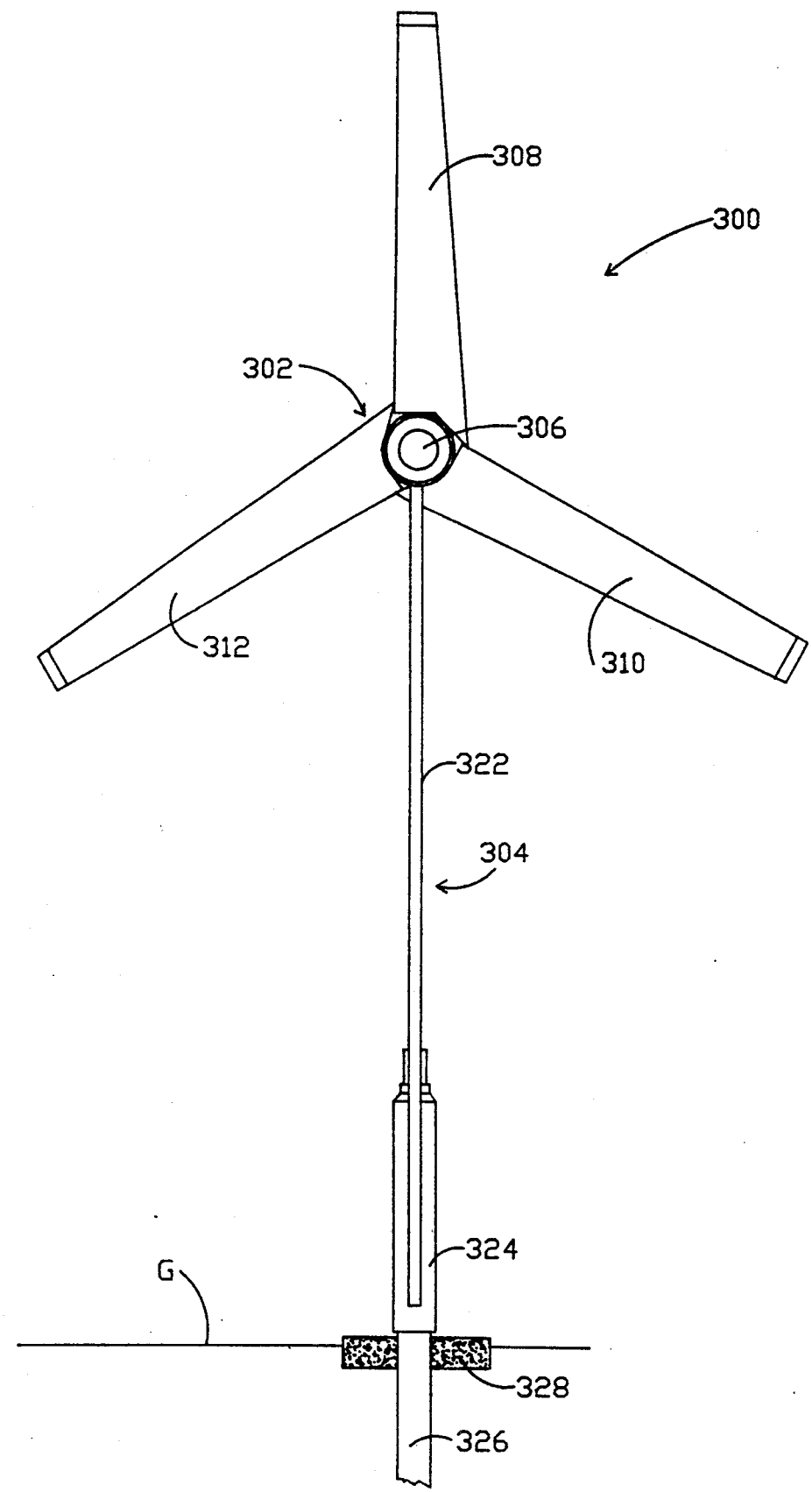
FIG. 6 is a front elevation view, toward the downwind direction, of a wind turbine assembly according to another embodiment of the invention.
Figure 7:
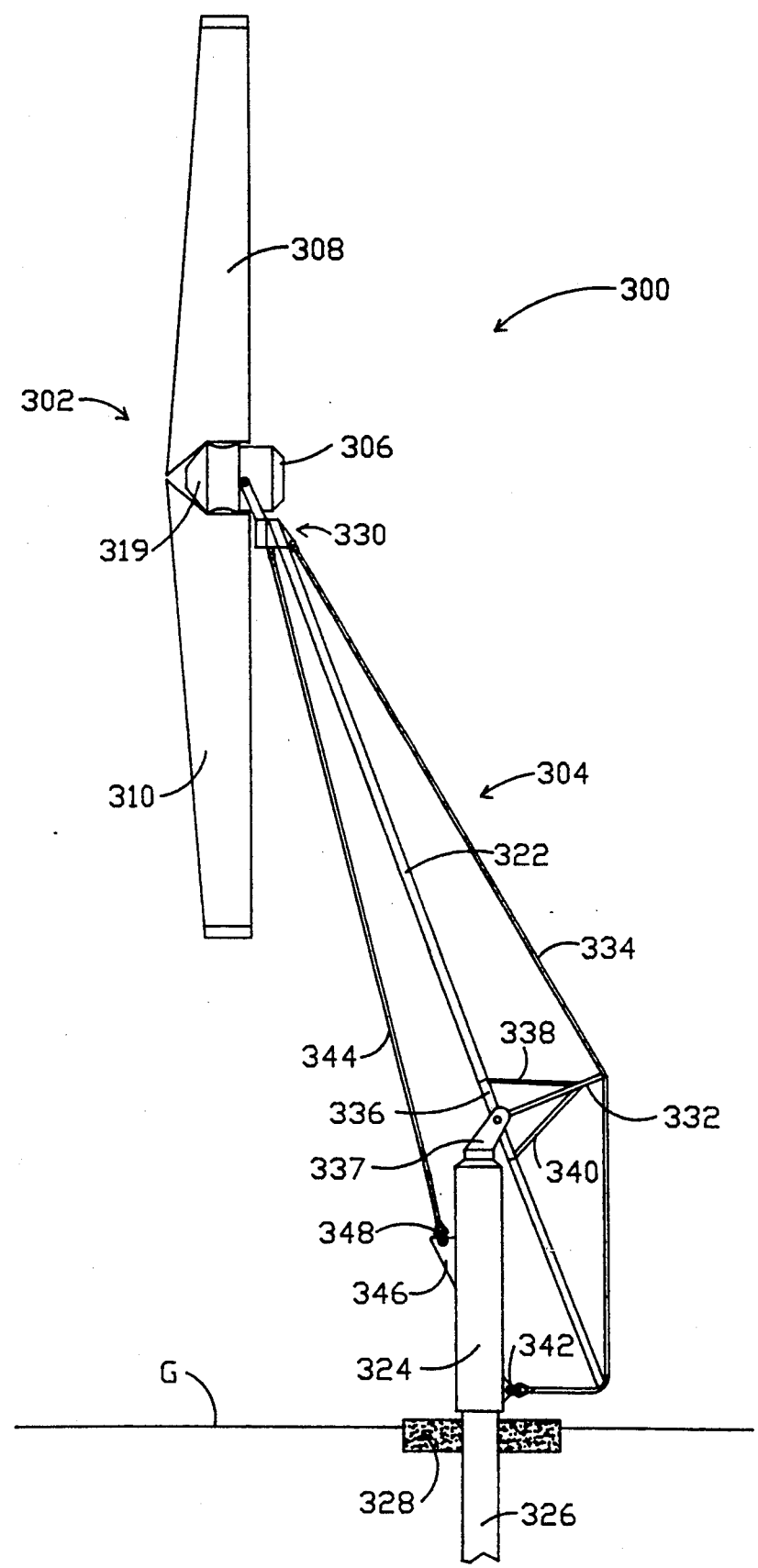
FIG. 7 is a side elevation view of the FIG. 6 wind turbine assembly.

FIG. 6 shows a front elevation view, looking in the downwind direction, and FIG. 7 is a corresponding side elevation view, of a wind turbine assembly according to another embodiment of the present invention, and featuring a self-guying tower construction.

As shown in FIGS. 6 and 7, the wind turbine assembly 300 comprises a turbine 302 mounted on a self-guyed tower 304. The turbine 302 comprises a rotor body 319 which is coupled with and rotatable against a nacelle 306. The rotor body 319 has three rotor blades 308, 310, and 312 mounted thereon, in the previously described manner whereby independent suspension of each of such rotor blades is provided. The nacelle 306 is joined to the tower 304 by means of a coupling arrangement 330 which is more fully shown in the enlarged side elevation view of FIG. 8. The tower 304 comprises a main tubular member 322 extending through a pivotable sleeve 336 which is secured by flange connector 337 to tubular member 324 which is telescopically mounted on shaft 326 for rotation thereon. The shaft 326 descends downwardly through a footing member 328 disposed at ground level G, and extends into the earth for a selected distance imparting structural rigidity and integrity to the wind turbine assembly.

Extending transversely outwardly from sleeve 336 and pivotally secured by flange connector 337 to form a conjoint structure therewith, the strut 332 is secured to sleeve 336 by means of guying cables 338 and 340, as shown.

An upwind guying cable 334 is secured at an upper end of the tower and extends over the transverse strut 332 and downwardly over the lower end of main tubular member 322 to a lower extremity which is secured to tubular member 324 by means of mechanical fastener 342.

A downwind guying cable 344 is tensionally secured to the upper end of tower 304 and the tubular member 324, being secured at its lower end to a flange extension 346 extending radially outwardly from tubular member 324, with the guying cable 344 being joined thereto by mechanical fastener 348.

By this arrangement, the tower 304 is self-guying in character, and of extremely light weight and aerodynamic character (the apparent surface thereof is presented to the wind (see FIG. 6) being very low in magnitude. This tower arrangement thus is able to respond quickly and efficiently to sudden changes in wind direction and to follow the wind direction in a closely conforming manner.

Figure 8:
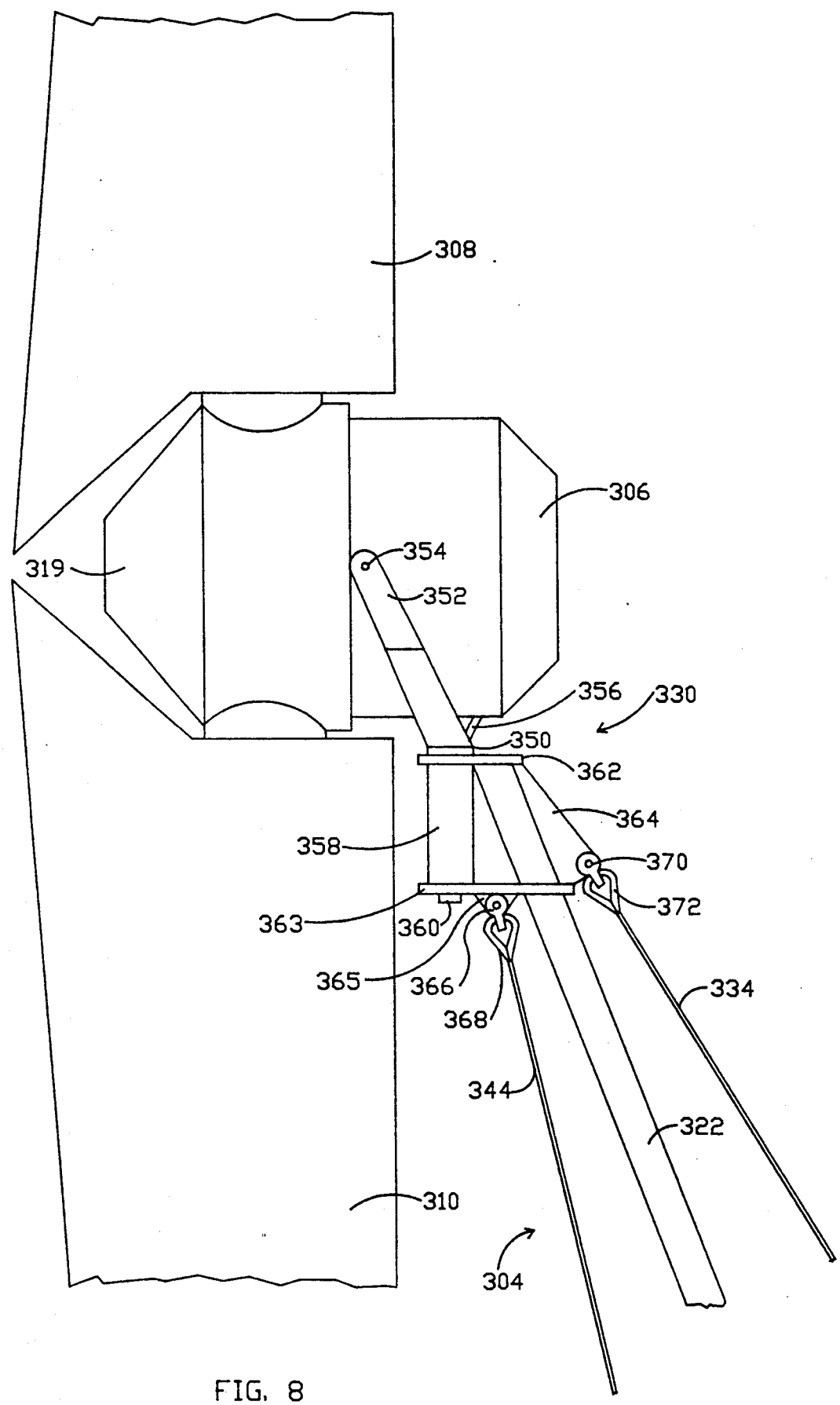
FIG. 8 is a side elevation view of a portion of the wind turbine assembly of FIGS. 6 and 7, showing the details of the mounting of the turbine on a tubular tower of a self-guying character.

Referring to FIG. 8, there is shown an enlarged view of the coupling arrangement 330 of FIG. 7.

As shown, the nacelle is coupled with an upper end of the tower 304 by a Y-shaped yoke member 350, the upper legs 352 of which (the rear leg not being visible in this view) are secured to the nacelle 306 by means of mechanical fasteners 354. The nacelle 306 is coupled with a pitch-damping means 356, as for example a Macpherson strut or other shock absorber or damping means, with the pitch-damping means being joined at one end to the yoke member 350 and extending into the interior space of the nacelle where such means may be secured to the interior structure of the turbine body, such as a bulkhead, partition, or other structural member. The stem 360 of the Y-shaped yoke member 350 is disposed in a cylindrical sleeve 358 extending between end plates 362 and 363 of the tower. In this manner, the Y-shaped yoke member 350 is rotatable in sleeve 358. The stem 360 may be yaw-damped inside sleeve 358 in any suitable manner, for additional flexibility in changing wind conditions. The end plates 362 and 363 are also secured to main tubular member 322 by any suitable joining method, e.g., welding, etc., as shown. Extending radially outwardly from main tubular member 362 is a flange extension 364 having ring fastener 370 attached engaging ring clip 372 mounted at the extremity of upwind guying cable 334.

Extending downwardly from end plate 363 is an extension flange 365 having ring fastener 366 secured thereto and engaging connecting ring 368 attached to downwind guying cable 344.

By this arrangement, pitch of the turbine 302 is damped, to an extent determined by the tension provided by guying cables 334 and 344. This wind turbine assembly may not require any yaw-damping means, since it is of extremely low weight and is a highly efficient free yaw structure, responding efficiently to changes in wind direction. Nonetheless, if desired, the yaw of the wind turbine could be damped by suitable yaw-damping means, such as those illustratively described hereinabove in connection with the embodiment of FIGS. 1-3 hereof.

Figure 9:
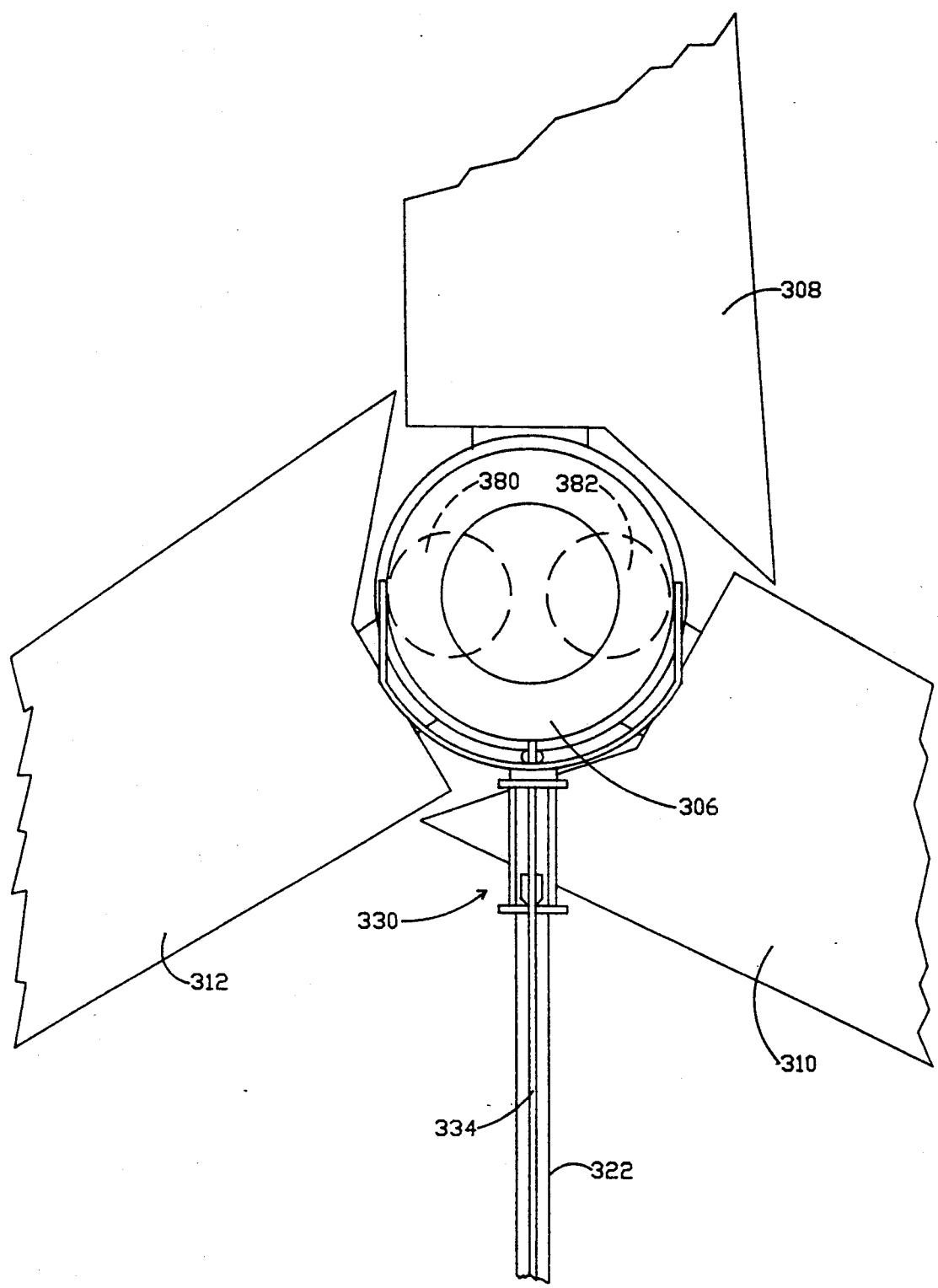
FIG. 9 is a front elevation view, looking toward the downwind direction, of a portion of the wind turbine assembly of FIGS. 6–8.

FIG. 9 is a front elevation view, looking in the downward direction at the portion of the wind turbine assembly shown in side elevation view in FIG. 8. As shown in FIG. 9, the rotor blades 308, 310, and 312 are mounted on the turbine body at 120° intervals about its circumference, and the nacelle 306 of the turbine is joined to the tower comprising main tubular member 322 by a coupling arrangement 330 which in turn is joined to upwind guying cable 334.

Shown in dotted line representation within the wind turbine are generator units 380 and 382, which may be driven by a primary drive gear in a counter-rotational manner, as hereinafter more fully described.

Figure 10:
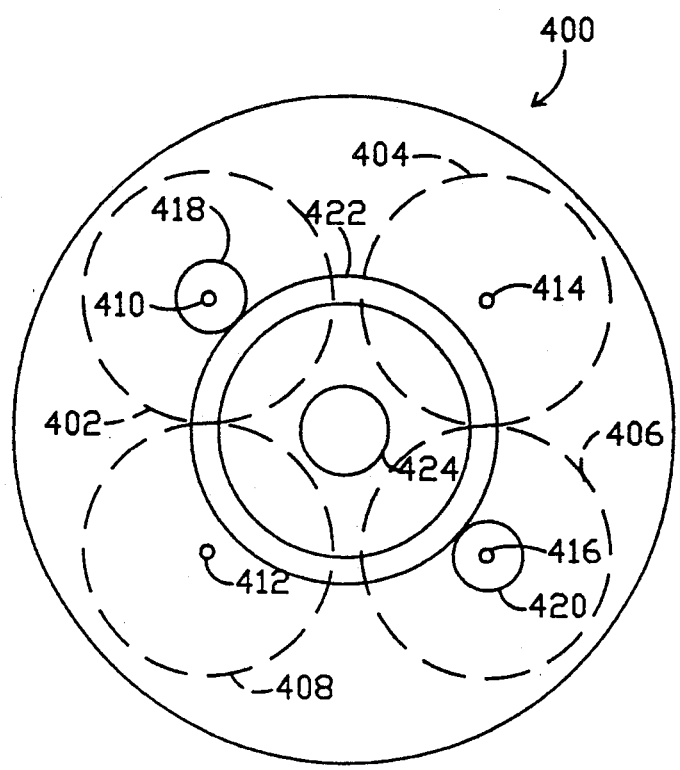
FIG. 10 is a schematic representation of a portion of a turbine body showing a primary drive gear and its relationship to secondary gears, as arranged for generating power from four (or alternatively, eight) power generators disposed within the nacelle.

FIG. 10 is a schematic representation of a turbine 400 in which the primary drive gear 422, which may be associated with the rotor body of the turbine, is in engagement with secondary gears 418 and 420 mounted on armatures 410 and 416 of generator units 402 and 406, respectively. This turbine arrangement includes two pairs of coupled generators, generator units 402, 404, 406, and 408 shown in dotted line representation, with units 402 and 408, and units 404 and 406, in paired relationship. Hollow axle 424 is shown for purposes of orientation in FIG. 10.

Figure 11:
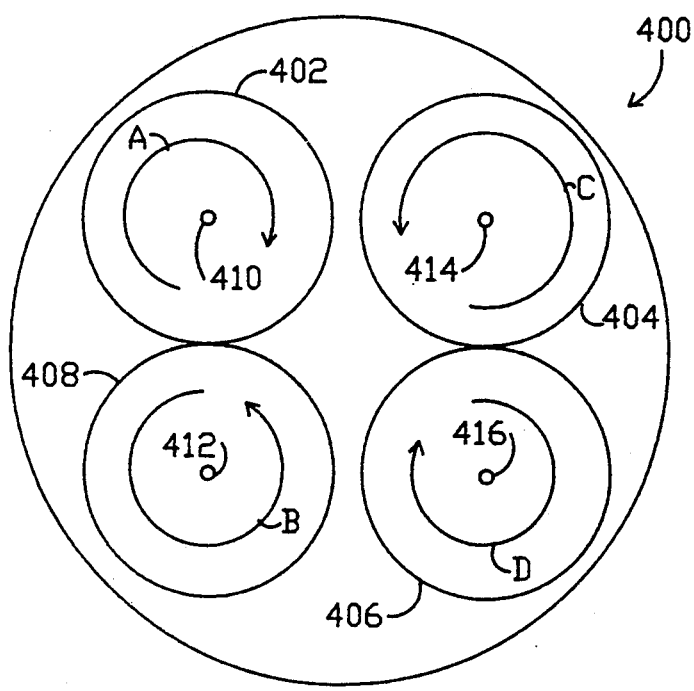
FIG. 11 is a schematic representation of a portion of the turbine corresponding to FIG. 10 but axially displaced therefrom, and showing the gearing associated with the power generators for achieving multiple counter rotation operation with power output from all four (or alternatively, eight) generator units.

The arrangement shown in FIG. 10 is a schematic representation at a downwind cross-section of the turbine body. A corresponding upwind cross-section adjacent thereto is shown in FIG. 11, in the aforementioned pair arrangement, with the turbines 402 and 408 being provided with complementary meshing gearing (not shown) whereby rotation of generator 402 in the direction of rotation indicated by arrow A effects counter rotation of generator unit 408 in the direction indicated by arrow B. In like manner, generator units 404 and 406 are paired and provided with meshing complementary gearing, such that rotation of generator unit 406 in the direction of rotation indicated by arrow D effects rotation of generator 404 in the direction indicated by arrow C. It will be recognized that a wide variety of arrangements are possible with respect to number of generator units, gearing arrangements, and innercoupling of generators with one another.

It will be understood that the generator units shown in FIG. 11 may be coupled with one another in any suitable manner, and with any suitable gearing/mechanical coupling for co-rotational or counter-rotational operation relative to one another.

Figure 12:
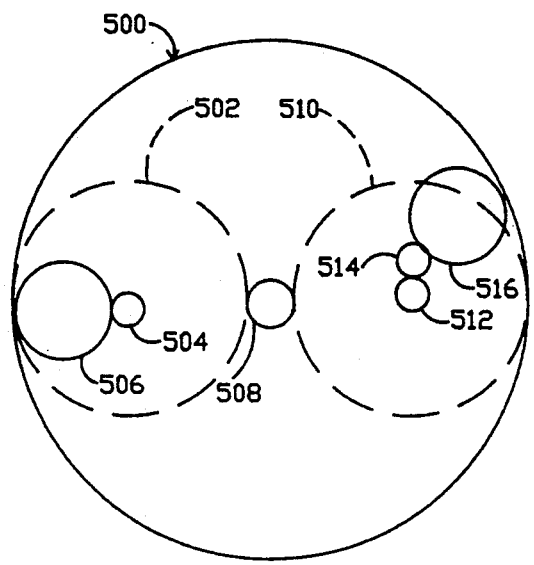
FIG. 12 is a schematic representation of a gearing arrangement for side-by-side counter-rotating generators in a wind turbine assembly.

FIG. 12 is a schematic representation of a gearing arrangement for side-by-side counter-rotating generator units 502 and 510. These generators are arranged, with a ring gear 500 being positioned in meshing contact with driven gears 506 and 516. Driven gear 506 meshingly engages a secondary gear 504 attached to the extended armature of generator 502. Generator 502 may be provided on its armature with a further gear engaging counter rotation gear 508, which in turn is meshingly coupled with a gear secured to the armature of generator 510.

Driven gear 516 meshingly engages ring gear 500, as well as secondary 514. Secondary gear 514 in turn meshingly engages armature gear 512 of generator unit 510.

The different gearing shown for generator units 502 and 510 are shown as illustrating different constituent gearing arrangement which may be adapted for transferring motive power from the rotor body of a turbine by means of a ring gear to driven and secondary gears. This difference between the gearing arrangements of the respective turbines in FIG. 12 is shown for illustrative purposes only, it being recognized that in typical practice, the gearing arrangements for each of the generator units will be constructed and arranged consistent with the rotational speeds appropriate to the component generator units.

Figure 13:
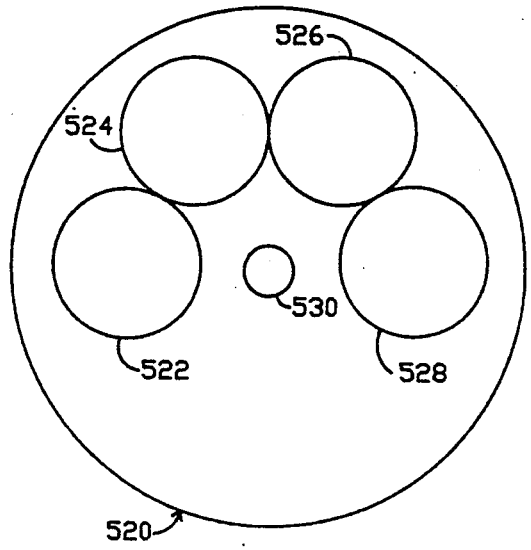
FIG. 13 is a schematic representation of another gearing arrangement featuring equal-sized gears coupled with corresponding generator units.

FIG. 13 shows a gearing arrangement for turbines in which four equal-size gears 522, 526, and 528 are disposed in sequential meshing relationship to one another as shown, within nacelle 520. In this arrangement, in which the gears are arranged around central axle 530, gears 522 and 526 rotate in a first direction of rotation, while gears 524 and 528 rotate in an opposite direction of rotation.

Figure 14:
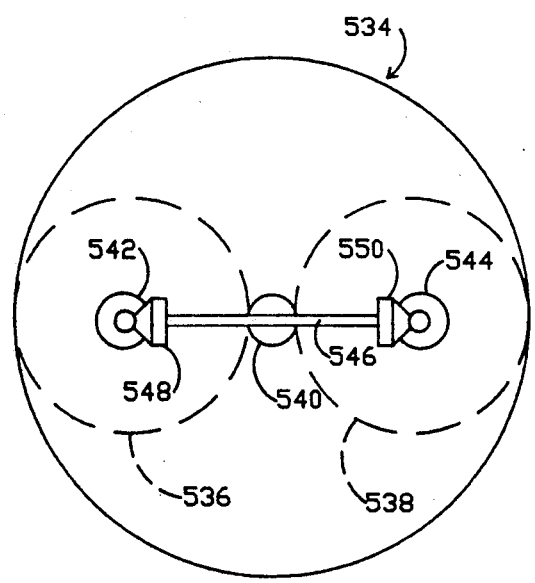
FIG. 14 is a schematic representation of a gearing arrangement for a wind turbine assembly, wherein counter-rotation of the generators is effected by direct 90° axle linkage forwardly of the generator units.

FIG. 14 shows a gearing arrangement in which generator units 536 and 538 are positioned within nacelle 534. Generator unit 536 is provided with armature gear 542 which is in meshing engagement with transmission gear 548 joined to shaft 546, at the opposite end of which is provided transmission gear 550 in meshing engagement with armature gear 544 of generator unit 538. There is thus provided a counter-rotation gearing arrangement by direct 90 axle linkage forward of the generators, which are arranged symmetrically with respect to the central axle 540.

Figure 15:
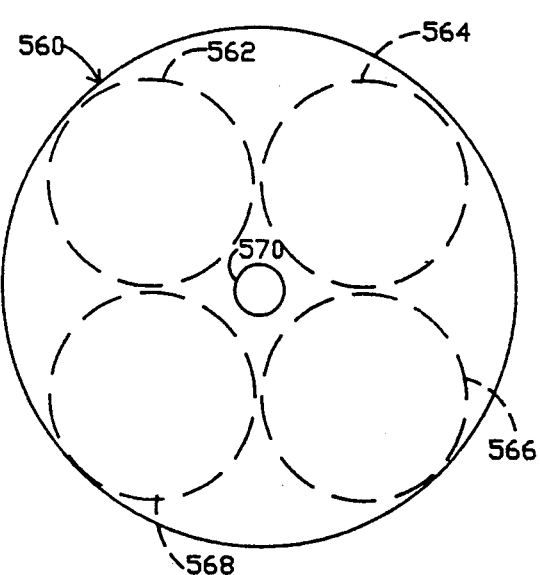
FIG. 15 is a schematic representation of four generator units in a turbine body.

FIG. 15 is a schematic representation of a turbine arrangement wherein generator units 562, 564, 566, and 568 are arranged symmetrically with respect to central axle 570, within nacelle 560. In this arrangement, each of the generator units is provided with a complementary gearing arrangement, whereby diagonally opposite generators units, e.g., generators 560 and 566, rotate in a first direction of rotation, while the other diagonally related pair of generator units 564 and 568 rotate in an opposite direction of rotation to the first pair.

It will therefore be appreciated that a number of specific spatial arrangements are possible for a multiplicity of generator units, as necessary or desired for a given wind turbine assembly, and that the specific gearing arrangement for transferring motive power of the rotor body to the generator units may be correspondingly varied, to effect any desired rotation scheme (co-rotation, counter-rotation, or a mix of both modes), with respect to constituent generator units.

While the invention has been described herein with specific reference to downwind configurations of wind turbine assemblies, it will be appreciated that the invention is not thus limited, but is usefully employed in upwind as well as downwind systems.

It will be recognized that the specific pitch adjustment system of the invention may be widely varied, as regards its constituent components. For example, referring again to FIG. 5, the adjustment pulleys 242 and 244 may be of cam or other noncircular shape, to provide a "neutral" position of adjustment.

Further, the tower employed with the wind turbine of the present invention may be widely varied in structure and operation. For example, it may be desirable in some instances to employ a pivoting booming tower capable of 360° damped yaw operation, which is provided with a redundant limited yaw damping system mounted at the upper end of the tower, with such redundant system being of a type as employed in the illustrative embodiment of FIG. 3. The tower may be constructed to accommodate limited yaw damping outside of a zone of free yaw operation, which may be of any desired angular extent, e.g., 270°, outside of which the damping means would effect damping retardation of the yaw movement. In an upwind configuration, the tower is preferably of a driven yaw character, with solid yaw damping at the upper end of the tower in connection with the coupling of the tower to the nacelle of the wind turbine.

It will be further recognized that the specific arrangement of the hydraulics in the illustrative embodiments herein described may be varied, to place such hydraulics in the proximal end of the nacelle, and with the control rod intermediate the rotor body and the nacelle being coupled with a mono-shock or other suitable damping means to provide additional damping capability to the turbine.

Accordingly, while the invention has been described with respect to specific features and embodiments, it will be appreciated that numerous variations, modifications, and embodiments are possible, and all such variations, modifications, and embodiments are therefore to be regarded, as being within the spirit and scope of the invention.

What is claimed is:

1. A wind turbine assembly including a rotor body having mounted thereon a plurality of rotor blades, wherein each of the rotor blades is joined at an inner extremity thereof to a blade stem projection extending interiorly into the rotor body and secured therewithin to the rotor body by torsional- and axial-shock damping connection means, wherein each blade stem projection comprises a hollow cylindrical housing defining a central longitudinal axis therein, with a support member interiorly disposed in the housing at an intermediate position along its axis and fixedly secured to the housing, a shaft fixedly secured at one end thereof to the rotor body and coupled at its other end with the support member in a manner allowing limited axial and rotational movement of the housing relative to the rotor body, and a longitudinally outwardly biasing means between the support member and the rotor body, extending along the axis of the housing and outwardly abuttingly biased against the support member, whereby the biasing means provides torsional and axial shock damping to the rotor blade.

2. A wind turbine according to claim 1, wherein the tortional- and axial-shock damping connection means comprise a helical coil spring as a shock damping element and said biasing means.

3. A wind turbine assembly according to claim 1, wherein each of the rotor blades is secured to the rotor body by independent torsional- and axial-damping connection means, to provide independent suspension to each of the rotor blades.

4. A wind turbine assembly according to claim 1, comprising from 2 to 6 rotor blades.

5. A wind turbine assembly according to claim 1, comprising from 2 to 8 power generator units coupled in power generating relationship to the rotor body.

6. A wind turbine assembly according to claim 1, wherein the rotor body is coupled to a nacelle for rotation with respect to the nacelle, wherein the rotor body comprises a circumferentially extending ring gear gearingly engaging a generator mounted in said nacelle.

7. A wind turbine assembly according to claim 1, wherein the rotor body is coupled to a nacelle for rotation with respect to the nacelle, and further comprising a self-guying tower to which the nacelle is secured, wherein the self-guying tower comprises: a shaft securable to a support structure; a tubular support member telescopically mounted on the shaft for rotation thereon; a flange connector mounted on the tubular support member at an upper end thereof; a sleeve pivotally mounted on the flange connector; a main tubular member extending through the sleeve and having a lower end and an upper end; nacelle mounting means joined to the upper end of the main tubular member and connected to the nacelle; a transverse strut extending transversely outwardly from the sleeve and secured to the sleeve to form a conjoint structure therewith; a first guying cable secured at a first end thereof to the nacelle mounting means at the upper end of the main tubular member, extending downwardly over the tranvsverse strut and the lower end of the main tubular member and secured at a second end thereof to the tubular support member; and a second guying cable secured at a first end thereof to the nacelle mounting means at the upper end of the main tubular member and secured at a second end thereof to the tubular support member.

8. A wind turbine assembly according to claim 7, wherein the nacelle mounting means comprise:
- a cylindrical sleeve secured to the upper end of the main tubular member;
- a shaped yoke swivel mounting member comprising upper legs joined to the nacelle at opposite sides thereof by mechanical fastening means, and a lower stem telescopically positioned in the cylindrical sleeve, to permit rotation of the nacelle and rotor body relative to the tower; and
- a pitch biasing and damping member interconecting the nacelle and the yoke swivel mounting member.

9. A wind turbine assembly including a rotor body having mounted thereon a plurality of rotor blades, wherein each of the rotor blades is joined at an inner extremity thereof to a cylindrical blade stem projection extending interiorly into a cylindrical receiving cavity in the the rotor body and secured therewithin to the rotor body in a manner allowing limited rotation of the blade stem projection relative to the rotor body, said limited rotation corresponding to a selected range of pitch of the associated rotor blade, and means for selectively rotating the cylindrical blade stem projections of each of said rotor blades by corresponding degrees of rotation to provide a predetermined pitch of said rotor blades, including torsional and axial biasing and damping means mounted within the cylindrical blade stem projection and connection means interconnecting the biasing and damping means in the cylindrical blade stem projection with the rotor body, said biasing and damping means serving to maintain the cylindrical blade stem projection in a torsionally and axially biased base position, a longitudinally extending control rod mounted coaxially within the rotor body for axial movement in either of opposing axial directions, means for selectively axially translating the control rod in a desired one of said opposing axial directions, and cabling coupling the control rod and said connection means so that axial movement of the control rod to a selected extent by said translating means in a first one of said opposing axial directions causes the cabling to be tensioned to tensionally rotate the connection means and cylindrical blade stem projection connected therewith so that the rotor blade associated with said rotated cylindrical blade stem is adjusted to a selected pitch level, and axial movement of the control rod to a selected extent by said translating means in a second one of said opposing axial directions causes the cabling to be detensioned to detensionally rotate the connection means and cylindrical blade stem projection connected therewith in an opposite direction of rotation toward said base position so that the rotor blade associated with said rotated cylindrical blade stem is adjusted to other selected pitches.

10. A wind turbine assembly according to claim 9, wherein the means for selectively axially translating the control rod in a desired one of said opposing axial directions comprise a piston joined to the control rod and mounted in a hydraulic cylinder, with means for selectively introducing hydraulic fluid into the cylinder to effect axial translation of the control rod in a desired one of said opposing axial directions.

11. A wind turbine assembly according to claim 9, wherein the cabling is part of a cable and pulley arrangement.

12. A wind turbine assembly according to claim 1, wherein the cable and pulley arrangement includes a fluid-damped shock absorber coupled to the cable.

13. A wind turbine assembly including a rotor body having mounted thereon a plurality of rotor blades, a nacelle to which the rotor body is coupled for rotation with respect to the nacelle, and a tower having an upper portion to which the nacelle is secured by coupling means, and a lower portion positionable on a support body, the tower upper portion including a cylindrical member at an upper end of the tower, wherein the coupling means comprise: a swivel mounting member comprising upper legs joined to the nacelle at opposite sides thereof by mechanical fastening means, and a lower stem telescopically positioned in the cylindrical member at the upper end of the tower and extending downwardly from the cylindrical member to a bottom stem portion, to permit rotation of the nacelle and rotor body relative to the tower; an oarlock connector joined to the bottom stem portion; a pitch biasing and damping member interconecting the nacelle and the oarlock connector, for pitch damping of the nacelle; and yaw biasing and damping means connecting the oarlock and upper portion of the tower, whereby the pitch damping/biasing member and the yaw biasing and damping means bias the rotor body and nacelle to a selected base position in relation to the tower, and dampen pitch and yaw displacements from said base position.

14. A wind turbine assembly according to claim 13, wherein the pitch biasing and damping member and the yaw biasing and damping means are independently selected from the group consisting of spring biasing elements, tensionally flexible guying cables, and fluid-damped shock absorbers.

15. A wind turbine assembly according to claim 13, wherein the tower lower portion is adapted for ground surface mounting of the tower.

* * * * *

UNITED STATES PATENT AND TRADEMARK OFFICE
CERTIFICATE OF CORRECTION

PATENT NO. : 5,213,470
DATED : August 16, 1991
INVENTOR(S) : ROBERT E. LUNDQUIST It is certified that error appears in the above-indentified patent and that said Letters Patent is hereby corrected as shown below:

Column 1, line 61, "and/o" should read --and/or--.
Column 4, line 62, "270" should be --270°--.
Column 7, line 49, "blade" should be --blades--.
Column 14, line 42, "90" should be --90°--.
Column 16, line 42, delete "shaped".
Column 18, line 12, after "means" comprise: a", add --yoke--.

Signed and Sealed this

Twelfth Day of July, 1994

Attest:

BRUCE LEHMAN

Attesting Officer　　　Commissioner of Patents and Trademarks